July 26, 1927.

J. F. NORTON 1,637,273

PISTON

Filed Feb. 7, 1923

Inventor:
John F. Norton,
by his attorney
Charles S. Gooding.

Patented July 26, 1927.

1,637,273

UNITED STATES PATENT OFFICE.

JOHN F. NORTON, OF MATTAPAN, MASSACHUSETTS.

PISTON.

Application filed February 7, 1923. Serial No. 617,474.

This invention relates to an improved piston, particularly adapted for use in the cylinders of internal combustion engines.

The object of the invention is to provide a piston which primarily will act to prevent oil upon the cylinder bore of an internal combustion engine from passing along the periphery of the piston into the combustion chamber of said engine where it ignites and increases the amount of carbon formed and secondarily to prevent carbonized matter formed within the combustion chamber of an engine from becoming permanently deposited upon the outer surface of the end wall of said piston.

The invention consists in a piston as set forth in the following specification and particularly pointed out in the claims thereof.

Referring to the drawings.

Like numerals refer to like parts throughout the several views of the drawings.

Figure 1:
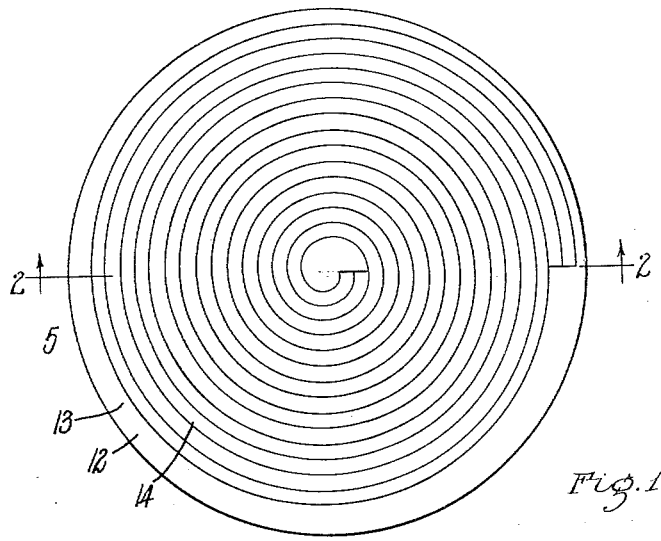
Figure 1 represents a plan view of a piston embodying the invention.
Figure 2:
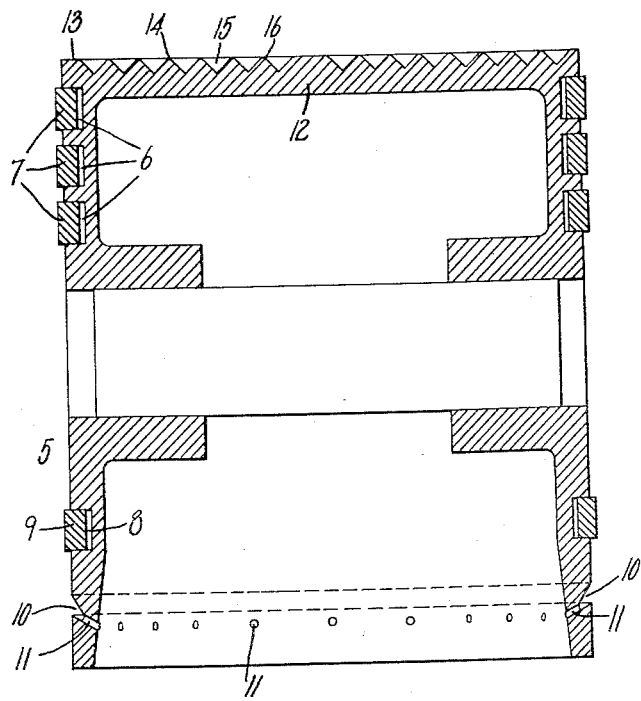
Fig. 2 is a vertical, longitudinal section through the piston taken on the line 2—2 of Fig. 1.

In the drawings, 5 represents a piston of an internal combustion engine, said piston being of well known construction and provided adjacent to the upper closed end thereof with a plurality of annular grooves 6 extending around the periphery thereof in each of which is located a piston ring 7 of the usual well known construction. Extending around the periphery of the piston 5 at a point adjacent to the lower end thereof is another annular groove 8 in which is located a piston ring 9. Located between the piston ring 9 and the lower extremity of the piston 5 is an oil groove 10 which also extends around the periphery of said piston, and said groove 10 projects inwardly and downwardly from the periphery of said piston and thereby forms a groove which will easily retain the oil and grease which is collected therein. A plurality of oil passages 11 extend inwardly and downwardly from the oil groove 10 and connect with the interior of the piston, and said passages act to conduct the oil which collects within the oil groove 10 from said groove to a point within the interior of the piston where said oil may drop downwardly through the open lower end thereof into the crank case of the engine.

It will thus be seen that much of the oil and grease which would ordinarily be carried upwardly along the surfaces of the cylinder bore and piston will be prevented from passing the piston ring 9 and will be collected in the oil groove 10 and thereby prevented from entering the combustion chamber of the engine where it becomes ignited and increases the amount of carbon formed.

The closed upper end 12 of the piston 5 is provided with an outer surface 13 in which are formed a plurality of corrugations 14 composed of grooves 15 and ridges 16 which are so arranged as to cover approximately the entire upper surface 13 of the piston. These grooves 15 and ridges 16 are provided for the purpose of eliminating the smooth surface heretofore always found at the upper end of a piston and as the piston expands and contracts with the alternate heating and cooling which it undergoes, there is a tendency caused by the presence of the corrugated upper surface to break up any incrustation of carbonized matter which may be formed thereon while the engine is running and thereby prevent said carbonized matter from collecting upon said upper surface and becoming permanently attached thereto.

It will be noted that in Figure 1 of the drawings the corrugations 14 formed by the grooves 15 and ridges 16 are spirally arranged upon the upper surface 13 of the piston 5 but it should be distinctly understood that I do not limit myself to any specific arrangement of grooves and ridges as any arrangement of said grooves and ridges will be equally effective and accomplish the same result and, therefore, fall within the scope of this invention.

I claim:

1. A piston for high-speed internal combustion gasoline engines embodying therein a closed end wall provided with a spiral corrugation upon the outer end surface thereof, the width of said corrugation being greater than its depth.

2. A piston for high-speed internal combustion gasoline engines embodying therein a closed end wall provided with a spiral shallow groove upon the outer end surface thereof.

In testimony whereof I have hereunto set my hand.

JOHN F. NORTON.